(12) United States Patent
Eitzinger et al.

(10) Patent No.: US 10,816,096 B2
(45) Date of Patent: Oct. 27, 2020

(54) LINEAR CONTROL VALVE

(71) Applicant: AVL LIST GMBH, Graz (AT)

(72) Inventors: Johann Eitzinger, Graz (AT); Hannes Gruber, St. Michael (AT); Martin Monschein, Dobersdorf (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 15/320,587

(22) PCT Filed: Jul. 3, 2015

(86) PCT No.: PCT/EP2015/065183
§ 371 (c)(1),
(2) Date: Dec. 20, 2016

(87) PCT Pub. No.: WO2016/001401
PCT Pub. Date: Jan. 7, 2016

(65) Prior Publication Data
US 2017/0184205 A1    Jun. 29, 2017

(30) Foreign Application Priority Data

Jul. 4, 2014 (AT) ............... A50467/2014

(51) Int. Cl.
*F16K 5/04* (2006.01)
*F16K 5/12* (2006.01)
(Continued)

(52) U.S. Cl.
CPC ............ *F16K 5/0407* (2013.01); *B60T 10/02* (2013.01); *B60T 13/18* (2013.01); *F16K 5/12* (2013.01); *F16K 27/065* (2013.01)

(58) Field of Classification Search
CPC ........ F16K 5/0407; F16K 5/12; F16K 5/0492; F16K 27/065; F16K 5/02; F16K 5/0207;
(Continued)

(56) References Cited

U.S. PATENT DOCUMENTS 3,349,799 A * 10/1967 Mueller ............... F16K 5/0407
137/625.22
4,020,684 A    5/1977 Dodt
(Continued)

FOREIGN PATENT DOCUMENTS

DE        4319015    12/1994
DE     102010041704     4/2012
(Continued)

OTHER PUBLICATIONS

English Abstract of DE102010041704, Dated Apr. 2012, Accessed on Jul. 7, 2017.
(Continued)

*Primary Examiner* — Craig J Price
*Assistant Examiner* — Andrew J Rost
(74) *Attorney, Agent, or Firm* — Dykema Gossett PLLC

(57) ABSTRACT

To achieve a compactly designed, simple and robust control valve for a hydrodynamic torque generator which is linear over a wide adjustment range, the control channel (12) of the control valve is formed in such a way that a substantially linear relationship between valve position ($\alpha$) and flow ($\dot{V}$) is achieved by rotating the valve body (6) between a first valve position ($\alpha_1$), which differs from the closed position, and a second valve position ($\alpha_2$) with a larger flow ($\dot{V}$) than in the first position ($\alpha_1$).

11 Claims, 8 Drawing Sheets

(51) Int. Cl.
  *B60T 10/02* (2006.01)
  *B60T 13/18* (2006.01)
  *F16K 27/06* (2006.01)

(58) Field of Classification Search
  CPC ............ F16K 5/04; B60T 13/18; B60T 10/02;
       G01M 15/04; G01L 3/20; F15B 11/044
  USPC .................................. 251/208, 209, 206, 207
  See application file for complete search history.

(56) References Cited

U.S. PATENT DOCUMENTS

| | | | |
|---|---|---|---|
| 4,793,357 A | 12/1988 | Lindstrom | |
| 4,989,833 A * | 2/1991 | Polon | F16K 5/0605 |
| | | | 137/1 |
| 5,108,075 A | 4/1992 | Downard et al. | |
| 5,551,467 A * | 9/1996 | Booth | F16K 5/0605 |
| | | | 137/1 |
| 5,834,654 A | 11/1998 | McFarland | |
| 6,561,324 B2 * | 5/2003 | Friedrich | B60T 1/087 |
| | | | 188/296 |
| 8,118,277 B2 * | 2/2012 | Cipolla | F16K 5/0407 |
| | | | 251/304 |

FOREIGN PATENT DOCUMENTS

| | | |
|---|---|---|
| EP | 0515965 | 12/1992 |
| EP | 2695816 | 2/2014 |
| JP | 2003184757 | 7/2003 |
| WO | 2006015220 | 2/2006 |
| WO | 2012175337 | 12/2012 |
| WO | 2014075772 | 5/2014 |

OTHER PUBLICATIONS

English Abstract of DE4319015, Dated Dec. 1994, Accessed on Jul. 7, 2017.
English Abstract of EP0515965. Dated Dec. 1992. Accessed on Jul. 7, 2017.
English Abstract of EP2695816, Dated Feb. 2014, Accessed on Jul. 7, 2017.
English Abstract of JP2003184757, Dated May 2014, Accessed on Jul. 7, 2017.

* cited by examiner

LINEAR CONTROL VALVE

BACKGROUND OF THE INVENTION

Field of the Invention

The present invention relates to a control valve having a valve housing with an inlet opening and an outlet opening which are connected by a flow channel, wherein a rotatably mounted cylindrical valve body is arranged in the flow channel, the axis of rotation of the valve body being arranged normally with respect to the longitudinal axis of the flow channel. The valve body includes a cutout which forms a continuous control channel which runs through the valve body and intersects the outside surface of the valve body, and a sealing land, which in the closed position of the control valve at least partially seals the flow channel, is formed on the valve body. Further, the invention relates to a hydrodynamic torque generator having such a control valve at the outlet and a method for controlling a hydrodynamic torque generator having such a control valve at the outlet.

The Prior Art

In many areas of application, so-called water brakes are used as a resistance for generating a load torque for a drive unit, in particular as a load assembly for testing such drive units or drive trains with drive units, such as, for example, an internal combustion engine, a drive train with internal combustion engine, a hybrid drive train, etc. Such water brakes can be found, for example, in U.S. Pat. No. 5,834,654 A or U.S. Pat. No. 4,020,684 A. WO 2012/175337 A1 describes a water brake as a load assembly on a test rig for internal combustion engines.

The load torque of such a hydrodynamic torque generator (water brake) is controlled substantially by means of the flow of the operating medium, generally water, through the torque generator. An inlet valve and an outlet valve, by means of which the flow through the torque generator is controlled, are normally arranged for this purpose, see, for example, U.S. Pat. No. 5,834,654 A.

When controlling the discharge of the operating medium from the torque generator, the main problem is the extremely low pressure difference available between the interior of the torque generator and the outflow as a consequence of the application. Control valves for this application are typically designed as butterfly valves with rotating throttle valves as also shown in U.S. Pat. No. 5,834,654 A or U.S. Pat. No. 4,020,684 A. Although this design can be very compact, the linear adjustment range of such valves, that is to say the range in which there is a linear relationship between the displacement of the valve body (angle of rotation) and flow (characteristic), is low due to the construction, which makes the control of such valves for setting a desired flow more elaborate.

Commercially available linear valves work with a control diaphragm, which artificially reduces the maximum available opening cross-section and therefore reduces the achievable flow parameters or increase the required pressure difference to obtain a linear characteristic.

Such a valve is described, for example, in EP 269 280 B1 or WO 2006/015220 A2. The disadvantage of valves with a control diaphragm is the increased flow resistance which results from the use of the control diaphragm. For a given (low) pressure difference, less water can therefore flow out than with a valve which opens fully. The use of an "appropriately larger" valve would increase the required installation space which, however, is often not available. Also, the commercially available valves (e.g., a control ball valve) are completely fluid-tight, which is not advantageous for the special application in a hydrodynamic torque generator. The same substantially applies for commercially available linear control valves which have a cylindrical throttle body.

Valves with longitudinally: adjustable throttle bodies (e.g., in the form of a valve cone), are typically less compact and usually require a mechanical conversion of a rotational movement (drive motor) to a linear movement of the throttle body. Pneumatic linear drives for such valves do not normally achieve the required adjustment speed or only achieve it with considerable effort. An electrical linear drive for applications of this kind typically consists of a servo motor with fitted spindle carriage which converts the rotary movement into a linear movement. Along with the increased installation space, this design is an additional service part which is subject to wear and is therefore an additional undesirable cost factor. A linear drive without movement conversion would be a coil with plunger armature, for example, which is controlled in its position. However, this kind of linear drive is not as widespread on the market as classical servo drives and therefore not 2 a cost perspective.

A control valve for controlling a volume flow, which has a cylindrical valve body with a cutout arranged in a tube, can be found in DE 10 2010 041 704 A1. By rotating the valve body in the tube, the free flow cross section and therefore the volume flow through the control valve changes. As a rule, such control valves exhibit a (profoundly) non-linear behavior and are therefore only suitable to a limited extent for an accurate control of a volume flow or such a control becomes complex.

In turn, DE 43 19 015 A1 shows a control valve with a throttle valve. Here, the internal form of the valve housing is specially shaped in the region of the throttle valve in order to linearize the relationship between flow and position of the throttle valve. However, this only allows a linearization to be achieved at the beginning of the adjustment range, that is to say starting at the closed position up to a certain adjustment angle, wherein the possible linearizable adjustment range is very limited for design reasons.

As a rule, however, hydrodynamic torque generators must be able to accurately set a large torque range, which requires a large adjustment range of the control valve. The operating range of interest of such torque generators lies between a minimum torque, which differs from zero, and a maximum torque. The linearization measures as described in DE 43 19 015 A1, are therefore unsuitable or unproductive for a control valve for a hydrodynamic torque generator, as accurate adjustment of a torque is practically impossible due to the very small linear adjustment range.

It is an object of the present invention to specify a compactly designed, simple and robust control valve for a hydrodynamic torque generator which is linear over a wide adjustment range.

SUMMARY OF THE INVENTION

According to the invention, this object is achieved in that the control channel is formed in the valve body in order to achieve a substantially linear relationship between valve position and flow by rotating the valve body between a first valve position, which differs from the closed position, and a second valve position with a larger flow than in the first position, and in that an inflow cross section to the valve body is smaller than an outflow cross section from the valve body, thus enabling the sealing land to be rotated through the flow channel when the valve body is rotated and in doing so the flow further increases or decreases linearly during the rotation. This enables a linear characteristic to be achieved in the particularly interesting adjustment range between a first valve position, which is not the same as the closed position, and a second valve position, which considerably simplifies the control of the control valve. As only the control channel has to be appropriately formed, this results in a simple, compact and robust control valve with few components. In addition, such a control valve is also very flexible, as the control valve can be quickly and easily adapted to suit different situations, in particular different required flow ranges, simply by replacing the valve body. Last but not least, this enables a particularly large possible adjustment range of the control valve to be achieved.

A clearly defined closed position of the control valve results when a sealing land, which at least partially seals the flow channel in the closed position of the control valve, is provided on the valve body. If the flow channel is not completely sealed, then this results in a certain leakage amount in the closed position, which is advantageous particularly for a control valve for a hydrodynamic torque generator, as this also provides for a flow through the hydrodynamic torque generator in the closed position, as a result of which a possible overheating of the rotor of the torque generator can be avoided.

When a connecting bridge is arranged on the valve body substantially diametrically opposite the sealing land, on the one hand, the mechanical strength of the valve body is increased and, on the other, the possible adjustment range of the control valve is maximized.

The outflow conditions in the valve body can be improved when a cutout is provided in the connecting bridge as, in this way, the operating medium has to be deflected to a lesser extent and less turbulence is produced.

A defined leakage amount in the closed position can easily be achieved when the valve body is arranged at least partially radially spaced apart from the valve housing to form a radial gap in the region of the outside surface through which medium can flow. The size of the radial gap then defines the achievable leakage amount.

In order to guide a leakage amount specifically over the outside surface of the valve body, a circumferential land, which projects radially out of the outside surface, can be provided at least at one axial end of the outside surface.

To control a hydrodynamic torque generator, it is particularly advantageous when an amount of operating medium which is fed to the torque generator is controlled at the inlet of the torque generator by means of a speed-controlled pump, and the amount of operating medium flowing from the torque generator is controlled at the outlet by means of the control valve, so that a level of operating medium which brings about the desired load torque is set up in the torque generator. Controlling the speed of the speed-controlled pump enables a more precise and also faster control of the feed of operating medium and therefore also a faster control of the level and therefore also of the load torque.

BRIEF DESCRIPTION OF THE DRAWINGS

The present invention is explained in more detail below with reference to FIGS. 1 to 14, which show advantageous embodiments of the invention in an exemplary, schematic and non-restricting form. In the drawings.

DETAILED DESCRIPTION

Figure 1:
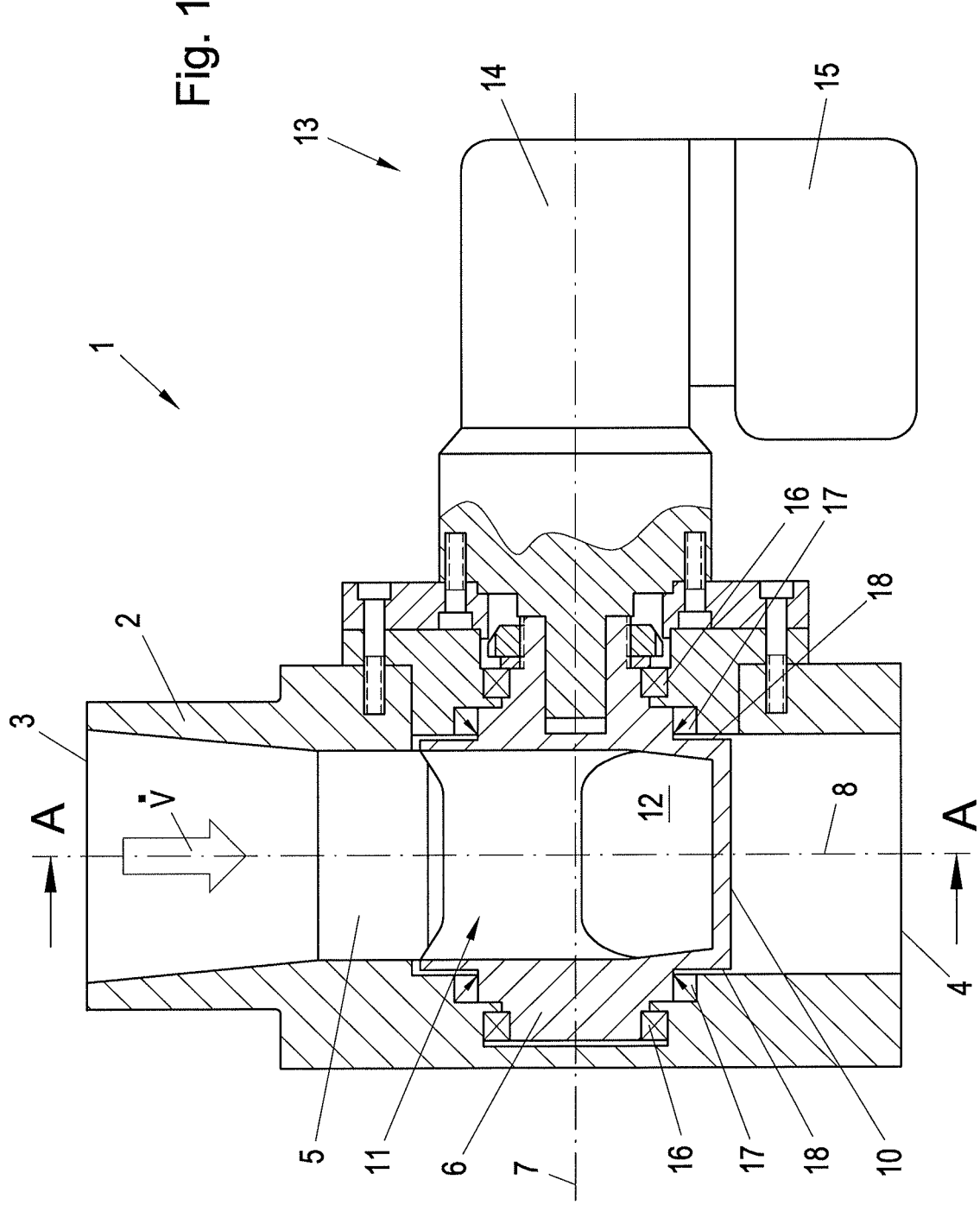
FIG. 1 shows a section through a control valve according to the invention.

As shown in FIG. 1, the control valve 1 according to the invention consists of a valve housing 2 with an inlet opening 3 and an outlet opening 4, to each of which pipes (not shown) for the feed and discharge of operating medium respectively can be connected in a suitable manner. An outlet of a hydrodynamic torque generator would be connected by means of a pipe, for example, or also directly to the inlet opening 3 of the control valve 1. The inlet opening 3 and the outlet opening 4 are connected by means of a continuous flow channel 5, through which an operating medium, generally water, flows during the operation of the control valve 1 from the inlet opening 3 to the outlet opening 4 (as shown by the arrow) with a certain flow $\dot{V}$ dependent on the position of the control valve 1. A cylindrical valve body 6 is arranged rotatably mounted in the valve housing 2 in the flow channel 5. The axis of rotation 7 of the valve body 6, which coincides with the longitudinal axis of the valve body 6, is arranged substantially normally to the longitudinal axis 8 of the flow channel 5. The valve body 6 is shown in detail in FIG. 2 and reference is also made in parallel below to FIG. 2.

As is usual with such control valves 1 in the form of a cylindrical valve, the outer, cylindrical outside surface 10 of the valve body 6 is arranged in the flow channel 5. A cutout 11 is arranged in the valve body 6, which forms a continuous control channel 12 through the valve body 6. The control channel 12 is aligned substantially perpendicular to the axis of rotation 7 of the valve body 6 and intersects the outside surface 10 of the valve body 6 on opposite sides of the valve body 6. The operating medium can therefore flow through the control channel 12 in the valve body 6. Depending on the position of the valve body 6, the control channel 12 thus defines the resulting free flow cross section in the control valve 1 and therefore the flow $\dot{V}$ through the control valve 1.

The valve body 6 is arranged rotatably mounted by means of suitable bearings 16 in the valve housing 2. In addition, suitable sealing elements 17 can also be arranged to seal the valve body 6 against the valve housing 2. The valve body 6 is connected in a fixed rotational relationship to an adjustment drive 13. Here, the adjustment drive 13 is designed as an electric motor 15 with angular gearbox 14, wherein the shaft output of the adjustment drive 13 is connected to the valve body 6 by means of a conventional shaft-hub connection. The valve body 6 can be rotated in the flow channel 5 about the axis of rotation 7 by means of the adjustment drive 13. The manner in which the valve drive 13 is connected to the valve body 6 and the valve housing 2 is, however, secondary for the invention. Basically, it would even be possible to provide means for manually rotating the valve body 6 instead of the adjustment drive 13.

Figure 3:
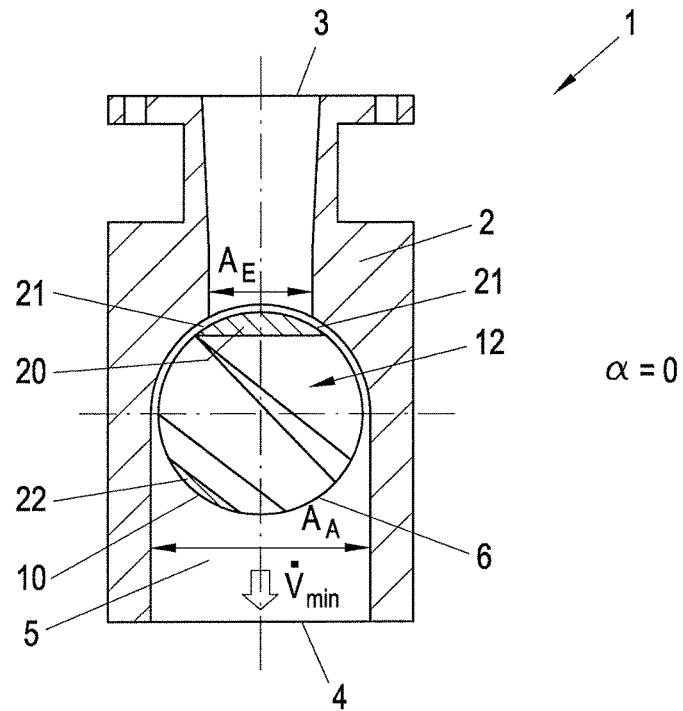
FIG. 3 shows a longitudinal section through the control valve in the closed position.
Figure 4:
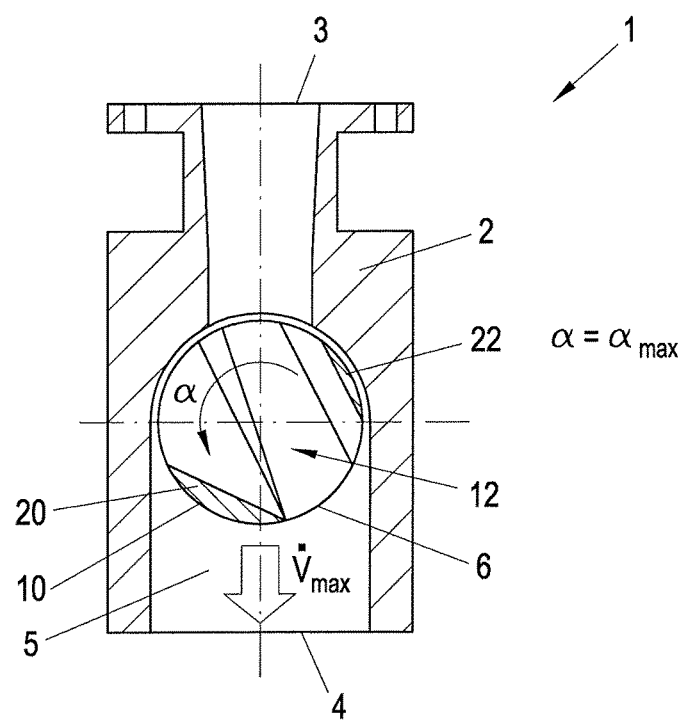
FIG. 4 shows a longitudinal section through the control valve in the open position.

A longitudinal section A-A through the valve housing 2 is shown in FIGS. 3 and 4, wherein FIG. 3 shows the closed position (0% open) of the control valve 1 and FIG. 4 the open position (100% open) of the control valve 1. Between these is the adjustment range of the control valve 1. An axially extending, cylindrical-segment-shaped sealing land 20, which seals the flow channel 5 of the control valve 1 in the closed position (FIG. 3), is formed radially outwards on the valve body 6 over part of the circumference of the valve body 6 by means of the cutout 11 for forming the control channel 12 through the valve body 6. If no leakage is desired in the closed position of the control valve 1, the sealing land 20 must completely close the flow channel 5. This defines the geometrical shape of the sealing land 20, at least the width of the cylindrical segment, on the outside surface 10 of the valve body 6. As a rule, a connecting bridge 22, which is arranged substantially diametrically opposite the sealing land 20 and which, like the sealing land 20, connects the two axial face surfaces 18 of the valve body 6 which border the outside surface 10, is also formed on the valve body 6 by the cutout 11. This connecting bridge 22 is advantageous for the valve body 6 for stability and strength reasons alone.

The inflow cross section $A_E$ of the flow channel 5 immediately before the valve body 6 is less than the outflow cross section $A_A$ of the flow channel 5 immediately after the valve body 6. This and the substantially diametric arrangement of the connecting bridge 22 result in a great adjustment range of the control valve 1. With this embodiment with the connecting bridge 22, the valve body 6 can be rotated until the connecting bridge 22 has been swiveled into the flow channel 5 at the inlet of the valve body 6 (FIG. 4). At the same time, the sealing land 20 can be swiveled into the flow channel 5, as the flow can flow past on both sides of the sealing land 20. The contour 23 can be designed such that, when the sealing land 20 is rotated through the flow channel 5, the flow $\dot{V}$ is further increased or reduced linearly (depending on the direction of rotation). The embodiment shown in FIG. 4 enables an adjustment range of approximately 180°.

However, there is a further important advantage of the control valve 1 according to the invention. The control valve 1 can be easily adjusted for different flows $\dot{V}$ and working ranges by replacing the valve body 6, which makes the control valve 1 very flexible.

Especially when the control valve 1 is used with a hydrodynamic torque generator, it is advantageous when a certain leakage amount $\dot{V}_{min}$ is set in the closed position. This can be achieved, for example, such that, as shown in FIG. 3, although the sealing land 20 covers the whole cross-sectional area of the flow channel 5, a radial gap 21, through which operating medium can flow in the closed position of the control valve 1, is provided at least in some parts in the region of the outside surface 10 radially between valve body 6 and valve housing 2. Alternatively or in addition, the sealing land 20 could also be designed such that it does not cover the whole cross-sectional area of the flow channel 5 in the closed position, for example by providing cutouts, holes, etc.

During the operation of the hydrodynamic torque generator, the flowing operating medium can also become significantly heated. If an erroneous, accidental closing of the control valve 1 occurs during operation, the operating medium could be very significantly heated, which can lead to overheating of the rotor of the hydrodynamic torque generator. This could even damage or destroy the hydrodynamic torque generator. This can be effectively prevented by a defined leakage amount $\dot{V}_{min}$ in the closed position.

If the leakage amount $\dot{V}_{min}$ is achieved by means of a radial gap 21, the advantage of flushing the rotating valve body 6 is also achieved, as a result of which the risk of lime scale deposits or the deposition of particles on the valve body 6 is reduced.

If the valve body 6 is rotated through an angle of rotation $\alpha$ (shown by the arrow in FIG. 4), the inflow of operating medium from the inlet opening 3 to the control channel 12 is continuously opened, as a result of which the flow $\dot{V}$ through the control valve 1 increases. Normally, the control valve 1 would be fully opened and the flow $\dot{V}$ would be maximal when the sealing land 20 was swiveled completely out of the flow channel 5. But the adjustment range would therefore be very narrow. In addition, there would not be a linear relationship between flow $\dot{V}$ and angle of rotation $\alpha$.

Figure 5:
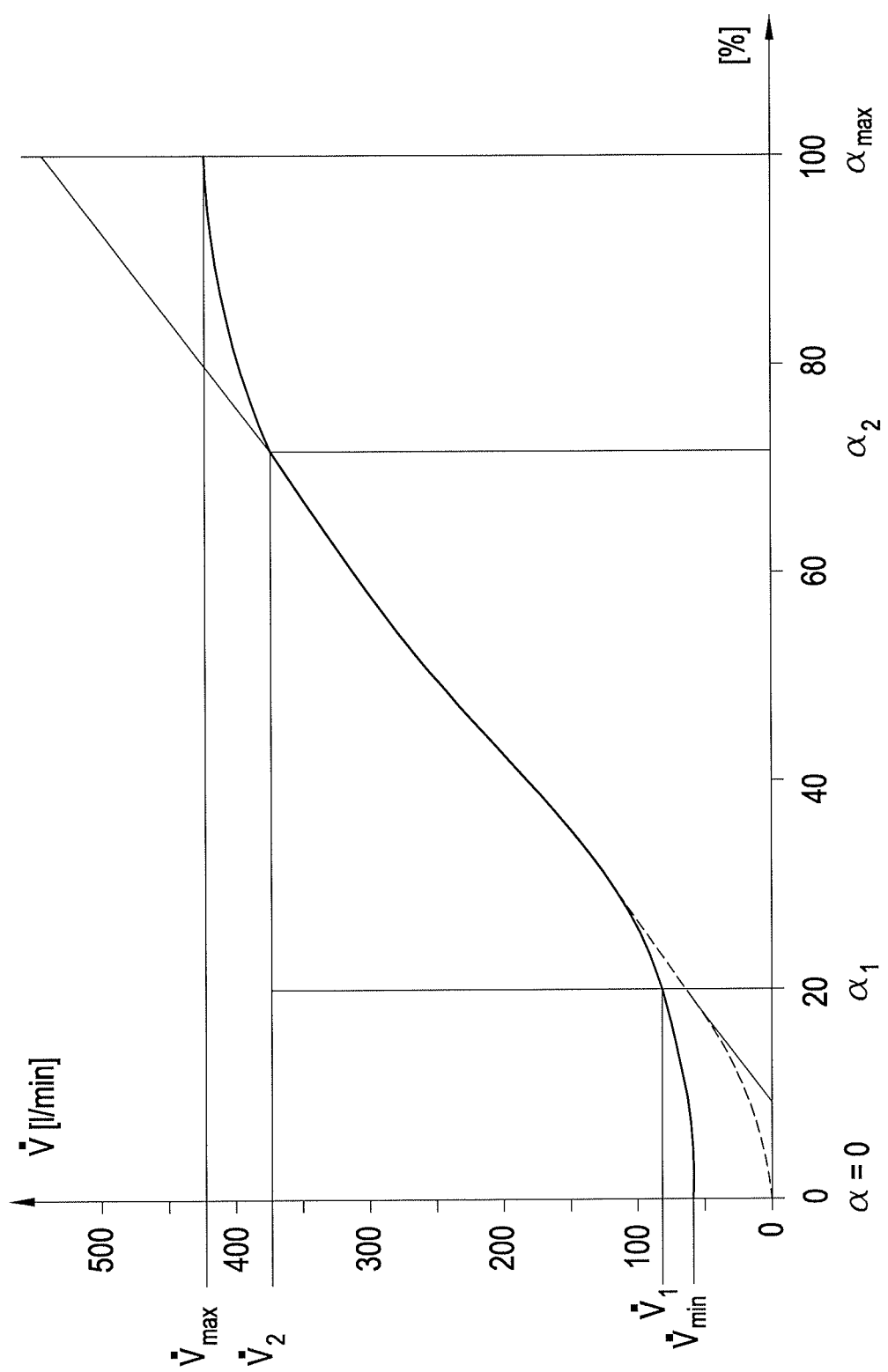
FIG. 5 shows a typical resulting linear characteristic of a control valve according to the invention.

To avoid this, the control channel 12 is designed in such a way that the flow $\dot{V}$ increases linearly over a wide part of the adjustment range, that is to say from a position $\alpha=\alpha_1$, which is not the same as the closed position at $\alpha=0$, to a position $\alpha=\alpha_2$, which is preferably less than the open position at $\alpha=\alpha_{max}$, as shown in FIG. 5 in the form of the flow versus percentage opening characteristic. This results in a linearized working range of the control valve 1 within the adjustment range between a first angle of rotation $\alpha_1$ with flow $\dot{V}_1$ and a second angle of rotation $\alpha_2$ with flow $\dot{V}_2$, or, as shown in FIG. 5, between a first opening of the control valve 1 in percent and a second opening in percent, wherein 100% opening corresponds to the position of the valve body 6 as in FIG. 4, that is to say before the connecting bridge 22 is swiveled into the flow channel 5 at the inlet.

In the characteristic shown, a leakage amount $\dot{V}_{min}$ is provided in the closed position of the control valve 1. Without leakage amount $\dot{V}_{min}$, this would result, for example, in the dashed curve of the characteristic in FIG. 5 in this region. Below the required working range, that is to say at $\alpha<\alpha_1$, the characteristic can be non-linear but can also be totally or partially linear.

The second angle of rotation $\alpha_2$ of the working range does not have to coincide with 100% opening, although it can, but preferably lies below the full opening of the control valve 1. The range from the second angle of rotation $\alpha_2$ to full opening with maximum flow $\dot{V}_{max}$ is preferably likewise designed with a linear characteristic (as shown in FIG. 5), likewise again by appropriate design of the control channel 12. However, this range $\alpha>\alpha_2$ does not necessarily have to be designed with a linear characteristic as shown in FIG. 5. This range $\alpha>\alpha_2$ represents an overload region which can be called upon in certain operating situations of the hydrodynamic torque generator, e.g. on shedding load or with a classic overload. During operation of the torque generator, it may also be necessary to vary the level within the torque generator, for which purpose the amount of operating medium flowing out of the torque generator is varied. Generally, this variation is not carried out via the amount of operating medium supplied but via the amount of operating medium flowing out, as this can be varied considerably more dynamically by means of the control valve 1, particularly when the amount of operating medium flowing in is controlled using a conventional valve or by means of a pump, wherein the amount of operating medium flowing in is affected by the mechanical inertia. The range between $\alpha_2$ and $\alpha_{max}$ (that is to say 100% opening) therefore represents a control reserve, for example for the sudden reduction of the level in the torque generator, and no longer necessarily has to satisfy the linear requirements.

The characteristic in FIG. 5 applies to a certain pressure difference (here 0.05 bar for example) between inlet opening 3 and outlet opening 4 of the control valve 1. Normally, there will be a family of characteristics for different pressure differences for a control of the control valve 1. Likewise, a possible effect of the temperature of the operating medium on the characteristic could be taken into account, e.g. again by means of appropriate characteristics.

The design of the control channel 12 can be determined, for example, in that an optimum progression of the contour 23 of the control channel 12, which gives the required linearity when the valve body 6 is rotated, is calculated, which can then be optimized iteratively, e.g. based on measuring tests. An empirical determination of the design of the cutout 11 or of the control channel 12 would also be conceivable. Basically, a person skilled in the art in the field of hydrodynamics is in a position to determine the design of the cutout 11. Because of the required linear characteristic of the flow, a contour 23 of the control channel 12, which somehow becomes narrower in cross section, will be chosen as shown in the figures.

Figure 2:
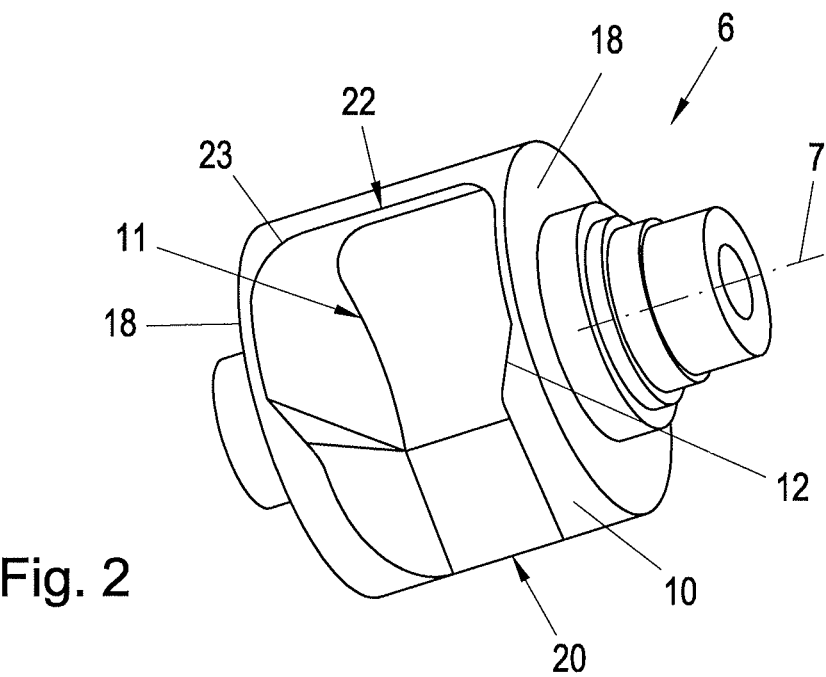
FIG. 2 shows an isometric view of a valve body of the control valve.

The design of the valve body 6 as shown in FIG. 2 is carried out, for example, initially based on the requirement of a linear progression of the characteristic in a required working range ($\alpha_1$ to $\alpha_2$) of approx. ⅔ of the adjustment range ($\alpha=0$ to $\alpha_{max}$). By this means, based on existing theoretical hydrodynamic relationships, a required cutout was calculated as a function of the angle of rotation α with the constraint of a required leakage amount $\dot{V}_{min}$ in the closed position at $\alpha=0°$ and the complete opening of the available geometrical cross section of the flow channel 5 in the open position at $\alpha_{max}$ (which corresponds to the outflow cross section $A_A$). The theoretical required function of the opening progression of the cutout 11 resulting from the form of the flow channel 5 to achieve the desired characteristic was verified by a flow test, and the deviation from the theoretically determined progression was determined. For example, a power function $A(\alpha)=k^*\alpha^{2/5}+A(0)$ was formulated for the rectangular cross section of the flow channel 5 used. Here, A designates the resulting flow cross section of the control channel 12 at an angle of rotation α and k a scaling parameter which scales the function to the maximum possible opening area. For the application of this relationship to a cylindrical valve body 6 and a flow channel 5 with rectangular flow cross section S, a deviation from this theoretical opening progression of the control channel 12 is to be expected. This deviation was determined by the test setup based on trials, and the optimum for a contour 23 of the control channel 12 found in several adaptation steps.

Figure 6:
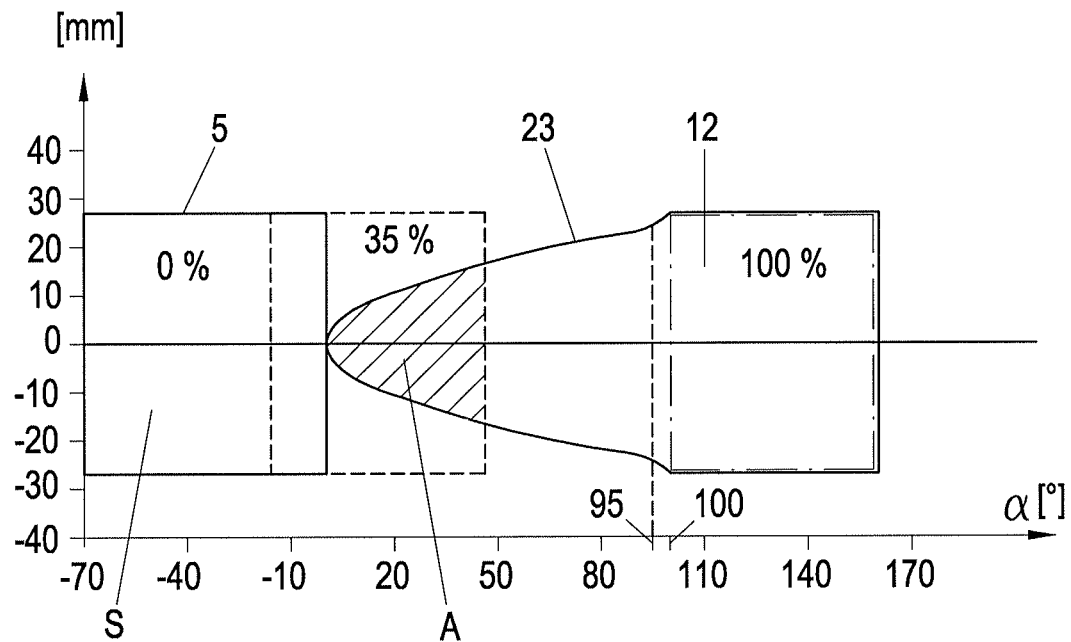
FIG. 6 shows a developed view of the outside surface of the valve body with a control channel.

The outside surface 10 of the valve body 6 is shown in a developed view in FIG. 6, wherein, for simplicity, only the contour 23 of the control channel 12 over the angle of rotation α and the flow cross section S of the flow channel 5 in different opening positions of the control valve 1 are shown. In FIG. 6, the 35% opening is shown dashed and the 100% opening of the control valve 1 is shown chain-dotted. In this exemplary embodiment, an adjustment range ($\alpha=0$ to $\alpha_{max}$) of approx. 170° is provided. It can be seen that this results in different flow cross sections A in different opening positions according to the contour 23 of the control channel 12. Here, the contour 23 substantially follows a power function. The step at approximately 95° designates the angle of rotation $\alpha_2$, above which the characteristic deviates from the linear characteristic (cf. FIG. 5). This opening progression gives rise to the linear characteristic within the working range ($\alpha_1$ to $\alpha_2$), as explained above.

Figure 7:
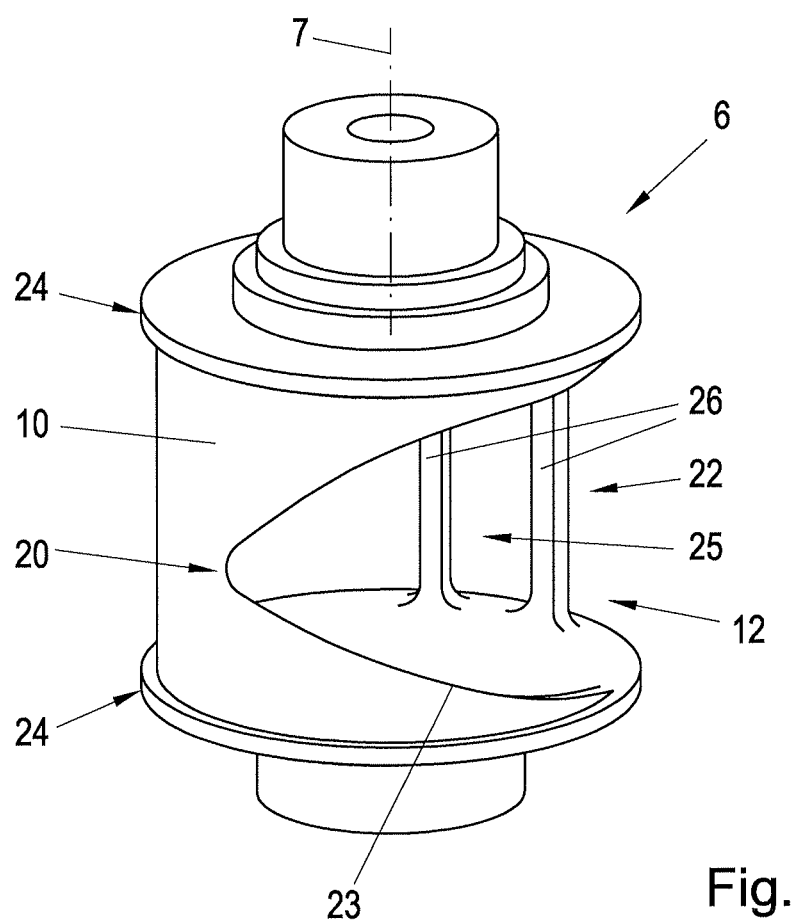
FIG. 7 shows an isometric view of a valve body of the control valve in an alternative embodiment.

An alternative embodiment of the valve body 6 is shown in FIG. 7. Here, circumferential lands 24 are arranged projecting radially out of the outside surface 10 at the axial ends of the outside surface 10, which substantially seal the radial gap 21 between valve body and valve housing (FIGS. 3, 4) in the region of the circumferential lands 24 in order to guide the leakage amount $\dot{V}_{min}$ specifically over the outside surface 10 of the valve body 6. Under certain circumstances, however, only one such circumferential land 24 may be sufficient. Such circumferential lands 24 can also be provided in an embodiment according to FIG. 2. In addition, a cutout 25, by means of which two narrow connecting lands 26 are formed, is provided in the connecting bridge 22. The cutout 25 results in an improved outflow behavior of the operating medium from the valve body 6 in the regions in which the connecting bridges 22 are swiveled through the flow channel 5 at the outlet, as the operating medium is deflected to a lesser extent and less turbulence is produced.

Figure 8:
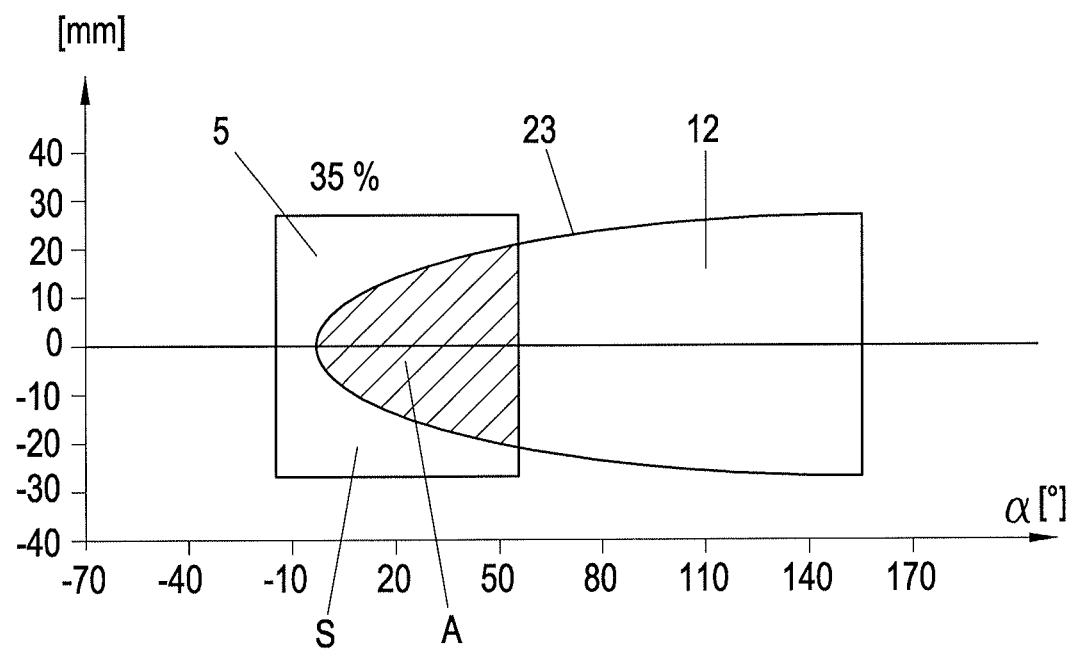
FIG. 8 shows a developed view of the outside surface of this valve body with a control channel.

The outside surface 10 of the valve body 6 according to FIG. 7 is again shown in a developed view in FIG. 8. Here, the contour 23 of the control channel 12 follows an elliptical function (ellipse equation) as far as the open position at 100% ($\alpha_{max}$). This results in a linear characteristic almost up to the 100% open position of the valve body 6.

Figure 9:
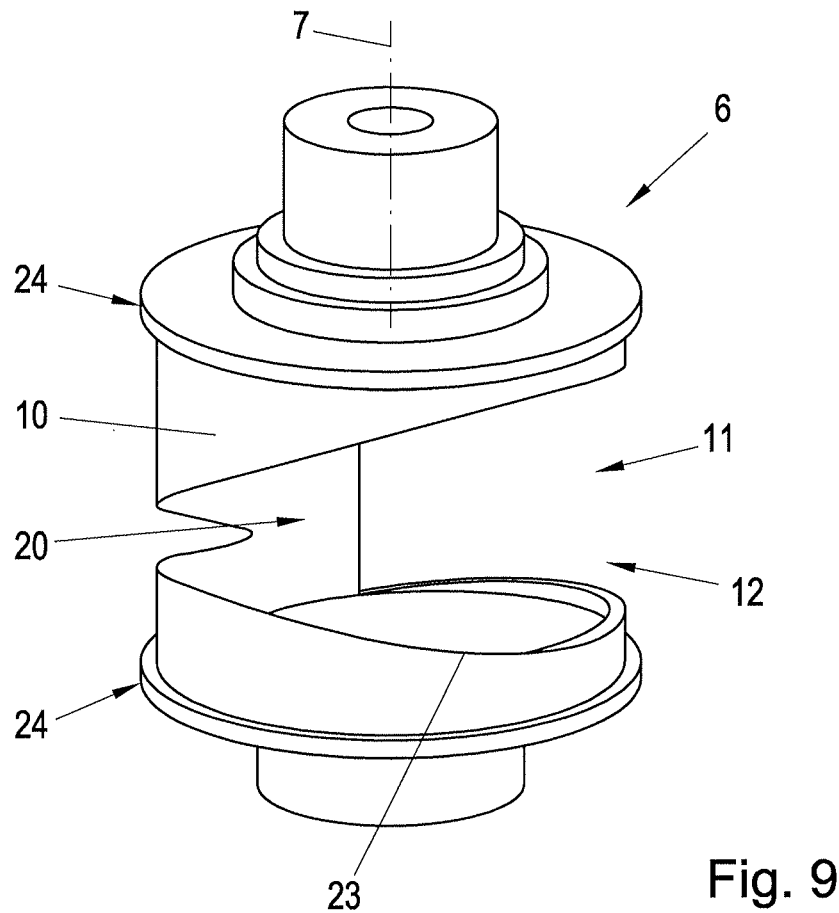
FIG. 9 shows a view of a valve body without connecting bridge.

However, it is also possible to use a valve body 6 without connecting bridge 22 as shown in FIG. 9. In this embodiment, the valve body 6 is completely cut out apart from the remaining sealing land 20 to form the control channel 12 by means of the cutout 11 with the contour 23. As a result, only the section of the outside surface 10 of the valve body bordering the sealing land 20 remains. At the same time, the circumferential lands 24 can also be omitted or arranged on only one side. Such a valve body 6 would have the advantage that the possible adjustment range could be significantly increased, as explained in conjunction with FIG. 10, in which the valve body 6 in the flow channel 5 is shown in different positions of the adjustment range from $\alpha=0$ to $\alpha_{max}$. In the closed position at $\alpha=0$, the sealing land 20 seals the flow channel 5 at the inlet to the valve body 6. Here too, a minimum flow $\dot{V}_{min}$ in the closed position could again be provided as described above. If the valve body 6 is rotated (in this case in the clockwise direction), the sealing land 20 is swiveled out of the flow region and a flow $\dot{V}$ is established depending on the angle of rotation α. If the valve body 6 is rotated further, after a certain angle of rotation α, the sealing land 20 swivels into the flow channel 5 at the outlet of the valve body 6. As the outflow cross section $A_A$ is greater than the inflow cross section $A_E$, the cutout 11, or its contour 23, of the valve body 6 can be designed in this region such that, when the valve body 6 is rotated further, the flow $\dot{V}$ is not reduced but, in contrast, is further increased linearly, as the flow can flow past on both sides of the sealing land 20. The valve body 6 can be rotated further until, after almost fully rotating the valve body 6, the sealing land 20 would again be swiveled into the flow channel 5 at the inlet. This enables the realization of a very wide adjustment range, which is defined substantially by the angular extension of the sealing land 20 ($\alpha_{max}=360°-\alpha_V$). In order to realize the desired linear relationship between valve position $\alpha$ and flow $\dot{V}$, at least in the working range ($\alpha_1$ to $\alpha_2$), the contour 23 of the cutout 11 extends over a greater circumferential region as shown in FIG. 9.

This wide adjustment range could also be realized by a very narrow connecting bridge 22 substantially diametrically opposite the sealing land 20 viewed in the circumferential direction, as such a narrow connecting bridge 22 hardly affects the flow $\dot{V}$. This also applies substantially to an embodiment according to FIG. 7 if the connecting lands 26 are made very narrow viewed in the circumferential direction. Another possibility would be to move the connecting bridges 22 further into the center of the valve body 6, as this does not affect the flow at the outlet from the valve body 6 or only affects it insignificantly. If necessary, the effect of the connecting bridges 22 or the connecting lands 26 on the flow $\dot{V}$ could also be compensated for by an appropriate design of the contour 23.

Figure 11:
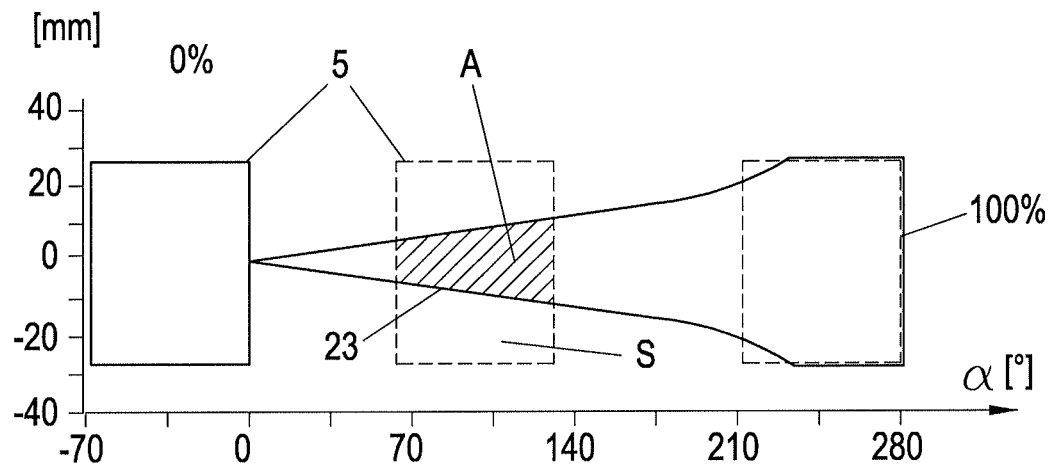
FIG. 11 shows a development of the outside surface of a valve body without connecting bridge and an adjustment range of approximately 280°.

The outside surface 10 of the valve body 6 according to FIG. 9 is again shown in a developed view in FIG. 11. Here, the contour 23 of the control channel 12 follows a power function or an elliptical function (ellipse equation) as far as the open position at 100% ($\alpha_{max}$ at approximately 300° angle of rotation). This results in a linear characteristic almost up to the 100% open position of the valve body 6.

Figure 12:
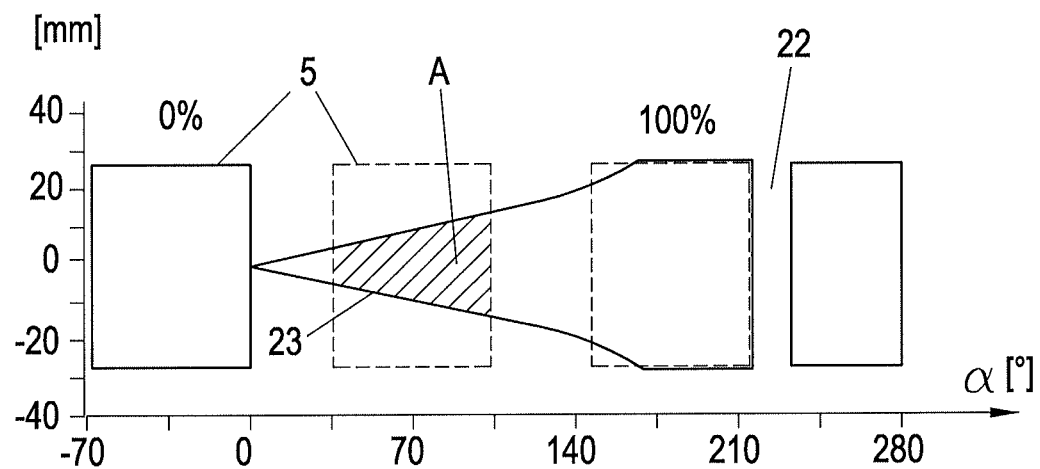
FIG. 12 shows a development of the outside surface of a valve body with connecting bridge and an adjustment range of approximately 220°.

The valve body 6 from FIG. 9 with a sealing bridge 22 is shown in a developed view in FIG. 12. Here, the 100% open position is already achieved at an angle of rotation of approximately 220°. However, the valve body 6 could still be rotated further up to an angle of rotation of approx. 280°. This non-linear range could be used for a maximum opening of the control valve 1 and hence for a maximum flow $\dot{V}_{max}$. However, the width of the sealing bridge 22 could also be compensated for by the contour 23, thus resulting in a linear adjustment range up to the maximum angle of rotation, here approx. 280°.

Figure 10:
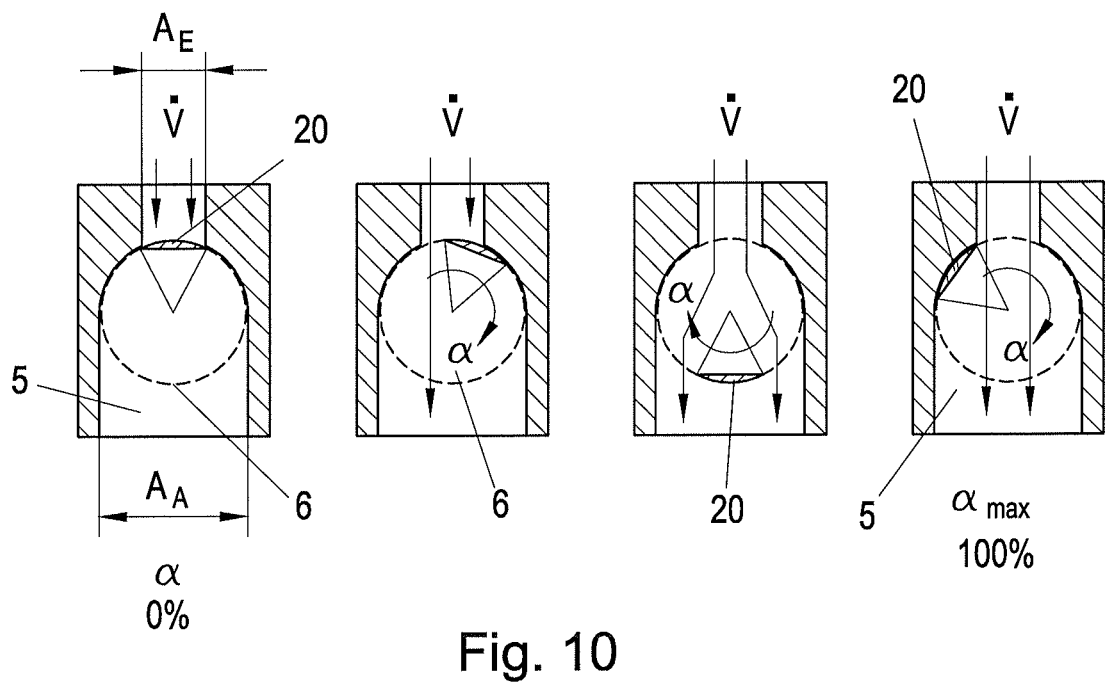
FIG. 10 shows the adjustment range of a valve body without sealing region.

An important feature of the control valve 1 according to the invention therefore arises in that the outflow cross section $A_A$ of the valve body 6 is greater than the inflow cross section $A_E$ to the valve body so that, when the valve body 6 is rotated, the sealing land 20 can be swiveled through the flow channel 5 on the outlet side. Here, as a result of the design of the cutout 11, or the contour 23, of the valve body 6, the flow through the control valve 1 is not reduced but, in contrast, is further increased or reduced linearly (depending on the direction of rotation), as the flow $\dot{V}$ can flow past on both sides of the sealing land 20 in a controlled manner (FIG. 10).

Figure 13:
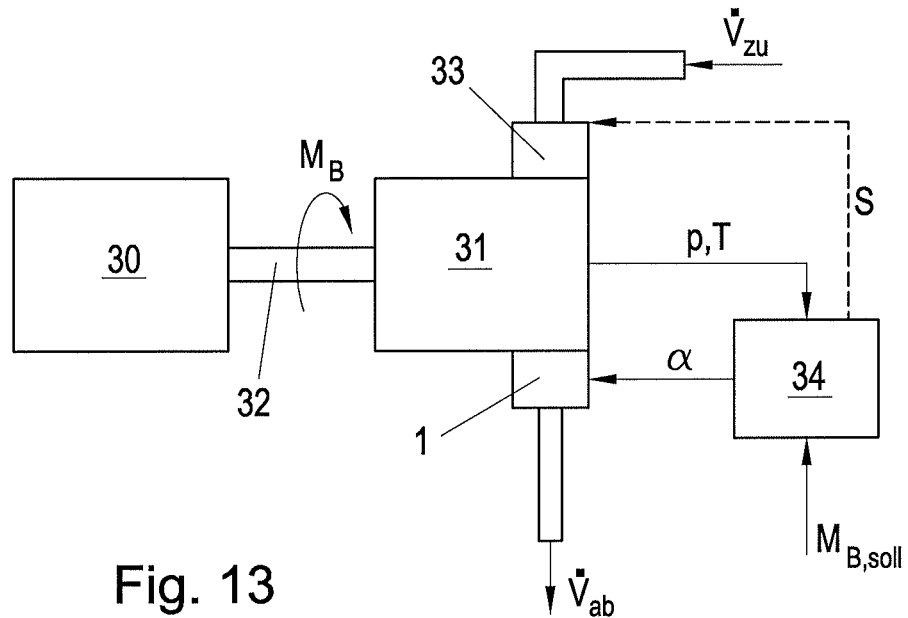
FIG. 13 shows a first control concept of a hydrodynamic torque generator with control valve according to the invention.

In FIG. 13 an exemplary use of a hydrodynamic torque generator 31 in a test rig is shown, wherein, here, a control valve 1 according to the invention is used at the outflow of the hydrodynamic torque generator 31. The hydrodynamic torque generator 31 is connected by means of a connecting shaft 32 to a test specimen 30, e.g. an internal combustion engine or a drive train, and generates a load torque $M_B$. The load torque $M_B$ is set by controlling the flow $\dot{V}$ of an operating medium through the hydrodynamic torque generator 31, by means of which a level is set in the torque generator. For this purpose, an inlet valve 33 is arranged at the inlet of the torque generator 31 and the control valve 1 according to the invention at the outlet. The inlet valve 33 can, of course, also be designed as a control valve 1 according to the invention. The inlet valve 33 controls the inflow $\dot{V}_{zu}$ and the control valve 1 the outflow $\dot{V}_{ab}$ of operating medium in order to obtain a desired level of the operating medium in the torque generator 31, which ultimately gives rise to the desired load torque $M_B$.

For this purpose, a control unit 34 can be provided, to which a load torque reference $M_{B,soll}$ to be set is applied, e.g. from a superimposed control device such as a test rig controller. The control unit 34 can capture further measured quantities of the torque generator 31, in particular the pressure p at the infeed of the torque generator 31 and a temperature T of the operating medium, and, based on an implemented control algorithm, determine therefrom a control variable a to be set for the control valve 1 (or the adjustment drive 13 of the control valve 1), and, if necessary, also a control variable S for the inlet valve 33 for the amount of water fed in.

Figure 14:
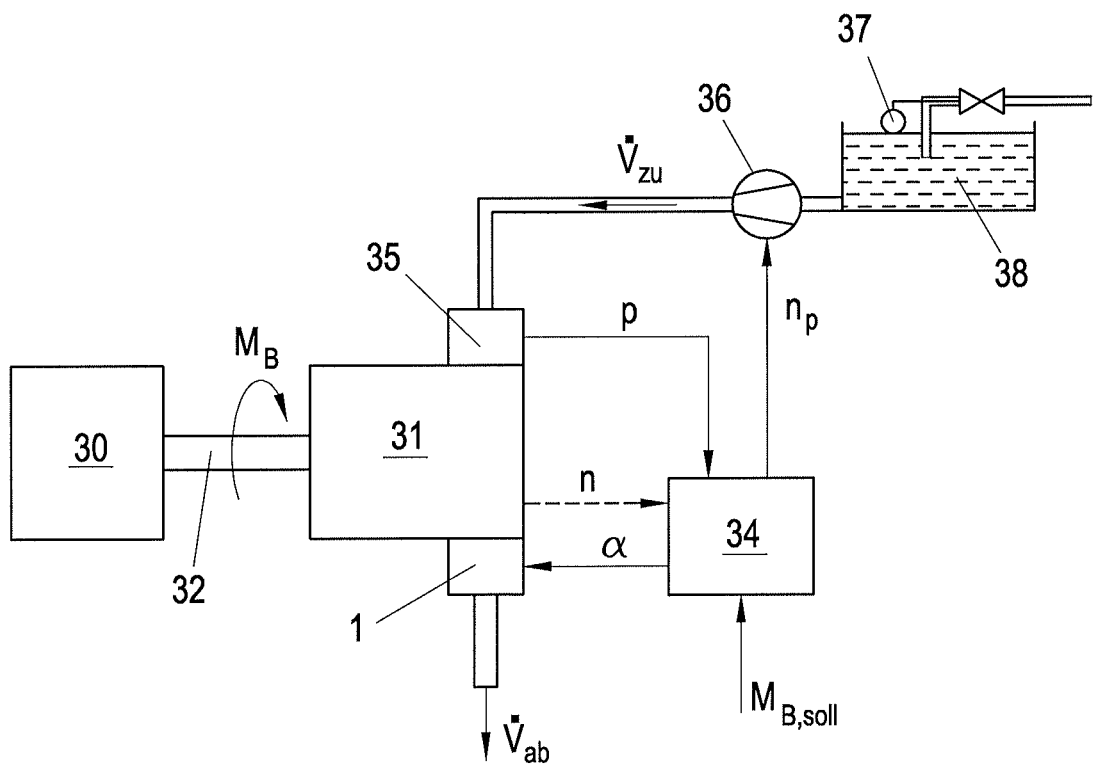
FIG. 14 shows a further control concept of a hydrodynamic torque generator with control valve according to the invention.

An alternative control of the torque generator 31 is described by means of FIG. 14. The control valve 1 for adjusting the outflowing amount $\dot{V}_{ab}$ of operating medium is again arranged at the outlet of the torque generator 31. However, a different suitable control valve, in particular a non-linear control valve, can also be arranged at the outlet for this control. However, no inlet valve is now provided at the inlet of the torque generator 31. Here, the quantity $\dot{V}_{zu}$ of operating medium fed to the torque generator 31 is controlled by means of a speed-controlled pump 36, which ensures a defined pressure progression at the inlet of the torque generator 31. The pressure at the inlet of the torque generator 31 can be measured by means of a pressure sensor 35 for this purpose. The pressure is important, as the characteristic of the control valve 1 is pressure-dependent, as described above. Controlling the speed $n_P$ of a speed-controlled pump 36 enables a more precise and also faster control of the infeed $\dot{V}_{zu}$ of operating medium compared with conventionally designed pressure controllers or control valves at the inlet. By supplying the pump 36 from an intermediate tank 38, an independence of short-term pressure variations in a pipe network for the operating medium, such as the water supply network for example, is also achieved. Here, the level in the intermediate tank 38 can be easily controlled, e.g. by a float valve 37, but can also be maintained in the required range by means of other known methods.

The hydrodynamic torque generator 31 can also exhibit a dependence in the speed of the torque generator 31, which can be taken into account in the control algorithm implemented, as indicated in FIG. 10.

The invention claimed is:

1. A method for controlling a hydrodynamic torque generator comprising:
   setting a load torque (MB) of the hydrodynamic torque generator by a control valve, wherein the control valve is arranged at an outlet of the torque generator;
   controlling an amount ($\dot{V}_{zu}$) of operating medium fed to the torque generator, through an inlet of the torque generator, via a speed-controlled pump;
   controlling an amount ($\dot{V}_{ab}$) of operating medium flowing from the torque generator via the control valve, so that a level of operating medium causes a desired load torque ($M_B$) in the torque generator, wherein the control valve includes
a valve housing including
an inlet opening,
an outlet opening, and
a flow channel extending from the inlet opening to the outlet opening, the flow channel defining a longitudinal axis; and
a cylindrical valve body rotatably mounted in the flow channel such that an axis of rotation thereof is normal to the longitudinal axis of the flow channel;
wherein the flow channel defines an inflow cross-section at an inlet to the valve body immediately upstream of the valve body and an outflow cross-section at a valve body outlet immediately downstream of the valve body, the outflow cross-section being larger than the inflow cross-section;
wherein said valve body has a cutout portion which provides a control channel that extends through the valve body and defines a sealing land which at least partially seals the flow channel at the inlet to the valve body when the valve body is in a closed positioning and achieves a substantially linear relationship between valve body positioning and media flow through the valve housing when the valve body is rotated between a first, not closed, positioning and a second positioning with a greater flow than when in the first positioning; and
wherein rotation of the valve body causes the sealing land to rotate through the flow channel at the valve body outlet and result in linear increases or decreases in flow through the valve housing; and
wherein the cylindrical valve body is configured and arranged to rotate more than 90 degrees relative to the valve housing.

2. A control valve for media which comprises:
a valve housing having an inlet opening, an outlet opening, and a flow channel extending from the inlet opening to the outlet opening, the flow channel defining a longitudinal axis; and
a cylindrical valve body rotatably mounted in the flow channel such that an axis of rotation thereof is normal to the longitudinal axis of the flow channel, and the cylindrical valve body is configured and arranged to rotate more than 90 degrees relative to the valve housing;
wherein the flow channel defines an inflow cross-section at an inlet to the valve body immediately upstream of the valve body and an outflow cross-section at a valve body outlet immediately downstream of the valve body, the outflow cross-section being larger than the inflow cross-section;
wherein said valve body has a cutout portion which provides a control channel that extends through the valve body and defines a sealing land, the sealing land configured and arranged to
at least partially seal the flow channel at the inlet to the valve body when the valve body is in a closed position,
achieve a substantially linear relationship between the valve body positioning and media flow through the valve housing when the valve body is rotated between a plurality of not closed positions, and
rotate through the flow channel in response to rotation of the valve body.

3. The control valve according to claim 2, wherein said valve body includes a connecting bridge diametrically opposite the sealing land.

4. The control valve according to claim 3, wherein said connecting bridge comprises two spaced connecting lands.

5. The control valve according to claim 2, wherein a radial gap for media flow is provided between an outer surface of the valve body and the valve housing.

6. The control valve according to claim 5, wherein said valve body includes a circumferential land which extends outwardly from the outer surface at at least one axial end of the outer surface.

7. A combination of a hydrodynamic torque generator which has an outlet and a control valve according to claim 2, the control valve being positioned to control flow of operating medium from the outlet of the hydrodynamic torque generator.

8. The control valve according to claim 2, wherein rotation of the sealing land within the flow channel at the valve body outlet results in a linear change in flow through the valve housing.

9. A method for controlling a hydrodynamic torque generator with which a load torque (MB) of the torque generator is set by the control valve according to claim 2, wherein the control valve is arranged at an outlet of the torque generator, wherein an amount ($\dot{V}_{zu}$) of operating medium which is fed to the torque generator is controlled at the inlet of the torque generator by a speed-controlled pump, and an amount ($\dot{V}_{ab}$) of operating medium flowing from the torque generator is controlled by the control valve, so that a level of operating medium which brings about a desired load torque ($M_B$) is set up in the torque generator.

10. A hydrodynamic torque generator comprising:
an outlet; and
a control valve positioned to control flow of operating medium from the outlet of the hydrodynamic torque generator, the control valve including
a valve housing including
an inlet opening,
an outlet opening, and
a flow channel extending from the inlet opening to the outlet opening, the flow channel defining a longitudinal axis; and
a cylindrical valve body rotatably mounted in the flow channel such that an axis of rotation thereof is normal to the longitudinal axis of the flow channel;
wherein the flow channel defines an inflow cross-section at an inlet to the valve body immediately upstream of the valve body and an outflow cross-section at a valve body outlet immediately downstream of the valve body, the outflow cross-section being larger than the inflow cross-section; and
wherein said valve body has a cutout portion which provides a control channel that extends through the valve body and defines a sealing land which at least partially seals the flow channel at the inlet to the valve body when the valve body is in a closed positioning and achieves a substantially linear relationship between valve body positioning and media flow through the valve housing when the valve body is rotated between a first, not closed, positioning and a second positioning with a greater flow than when in the first positioning,
wherein the cylindrical valve body is configured and arranged to rotate more than 90 degrees relative to the valve housing.

11. The hydrodynamic torque generator of claim 10, wherein rotation of the valve body causes the sealing land to rotate through the flow channel at the valve body outlet and result in linear increases or decreases in flow through the valve housing.

* * * * *